US012442325B2

(12) United States Patent
Häberle et al.

(10) Patent No.: US 12,442,325 B2
(45) Date of Patent: Oct. 14, 2025

(54) EXHAUST GAS ROUTING COMPONENT FOR AN EXHAUST GAS SYSTEM OF AN INTERNAL COMBUSTION ENGINE

(71) Applicant: Purem GmbH, Neunkirchen (DE)

(72) Inventors: Jürgen Häberle, Stuttgart (DE); Bernhard Reyer, Altbach (DE); Eder Castellanos Aguirre, Esslingen (DE); Amol Anil Karekar, Esslingen (DE); Markus Schmitt, Merchweiler (DE)

(73) Assignee: Purem GmbH, Neunkirchen (DE)

( * ) Notice: Subject to any disclaimer, the term of this patent is extended or adjusted under 35 U.S.C. 154(b) by 150 days.

(21) Appl. No.: 18/360,568

(22) Filed: Jul. 27, 2023

(65) Prior Publication Data
US 2024/0035409 A1   Feb. 1, 2024

(30) Foreign Application Priority Data

Jul. 28, 2022   (DE) ............... 10 2022 118 914.7

(51) Int. Cl.
*F01N 13/08* (2010.01)
*F01N 13/18* (2010.01)

(52) U.S. Cl.
CPC .......... *F01N 13/08* (2013.01); *F01N 13/1811* (2013.01); *F01N 13/1888* (2013.01)

(58) Field of Classification Search
CPC .. F01N 13/08; F01N 13/1811; F01N 13/1888; F01N 13/1894; F01N 2260/10; F01N 2470/06; F01N 2470/24
See application file for complete search history.

(56) References Cited

U.S. PATENT DOCUMENTS

| 3,775,979 | A | * | 12/1973 | Scheitlin | ............... F01N 13/102 60/322 |
| 3,899,302 | A | | 8/1975 | Wagner | |
| 3,982,396 | A | | 9/1976 | Suzuki | |
| 5,832,723 | A | * | 11/1998 | Iwata | ..................... F01N 13/08 60/276 |
| 6,018,946 | A | * | 2/2000 | Matsumoto | ......... F01N 13/1888 60/323 |
| 2024/0309791 | A1 | * | 9/2024 | Kalyanshetti | ......... F01N 13/141 |

FOREIGN PATENT DOCUMENTS

| DE | 24 54 704 A1 | 5/1975 |
| DE | 37 21 608 A1 | 1/1989 |
| DE | 41 07 539 A1 | 9/1992 |
| DE | 10 2004 058 998 A1 | 6/2006 |
| GB | 1 367 181 A | 9/1974 |
| JP | S52-92013 A | 8/1977 |

* cited by examiner

*Primary Examiner* — Anthony Ayala Delgado
(74) *Attorney, Agent, or Firm* — Walter Ottesen, P.A.

(57) ABSTRACT

An exhaust gas routing component for an exhaust gas system of an internal combustion engine includes a tube-like component body with a first component body end region and a second component body end region arranged in the direction of a component body longitudinal axis at a distance from the first component body end region. The component body includes a tube-like outer body and a tube-like inner body received in the tube-like outer body. The inner body is fixed in a fastening region on the outer body. A sliding guide is provided which acts between the outer body and the inner body and permits a relative movement of the inner body in relation to the outer body outside the fastening region.

16 Claims, 1 Drawing Sheet

EXHAUST GAS ROUTING COMPONENT FOR AN EXHAUST GAS SYSTEM OF AN INTERNAL COMBUSTION ENGINE

CROSS-REFERENCE TO RELATED APPLICATIONS

This application claims priority of German patent application no. 10 2022 118 914.7, filed Jul. 28, 2022, the entire content of which is incorporated herein by reference.

TECHNICAL FIELD

The present disclosure relates to an exhaust gas routing component for an exhaust gas system of an internal combustion engine.

BACKGROUND

In order to avoid heat loss in exhaust gas systems for internal combustion engines from the exhaust gas conducted through them, it is known to use double-walled exhaust gas routing components. For example, foamed insulation material or insulation material which is constructed with fiber material and provides thermal insulation can be arranged in a gap between a generally tube-like outer body and a generally tube-like inner body. The formation of an air cushion between an inner body and an outer body can also already contribute to thermal insulation.

In order to provide a fixed connection, the outer body and the inner body are fixedly connected to one another in a fastening region at the two end regions of a component body constructed with these, for example, by material connection. Since the outer body and inner body are heated to a different degree by the exhaust gas which substantially only comes into direct contact with the inner body, these are subject to different thermally induced dimensional changes, which can lead in particular between the two end regions to a significant thermomechanical loading of the outer body or the inner body or the fastening regions formed in the two end regions.

SUMMARY

An object of the present disclosure is to provide an exhaust gas routing component for an exhaust gas system of an internal combustion engine which, with a good thermal insulation action, avoids the occurrence of thermally induced loads.

According to the disclosure, the above object is achieved by an exhaust gas routing component for an exhaust gas system of an internal combustion engine, including a tube-like component body with a first component body end region and a second component body end region arranged in the direction of a component body longitudinal axis at a distance from the first component body end region, wherein the component body includes a tube-like outer body and a tube-like inner body received in the tube-like outer body, wherein the inner body is fixed in a fastening region on the outer body, and wherein there is provided a sliding guide which acts between the outer body and the inner body and permits a relative movement of the inner body in relation to the outer body outside the fastening region.

In the case of an exhaust gas routing component constructed according to the disclosure, in principle a defined positioning of these two bodies relative to one another is ensured by the provision of a fastening region in which the outer body and the inner body are fixed on one another. In regions outside this fastening region, the outer body and the inner body can in principle be moved in relation to one another, wherein relative movements between the inner body and the outer body caused by the sliding guide and the undefined, thermally induced loads, as well as loads caused by mechanical loads, such as, for example, vibrations, as a result of the provided guide action of the inner body in relation to the outer body are prevented.

In order to provide a defined flow volume, provided substantially by the inner body, for the exhaust gas in the exhaust gas routing component, it is proposed that, in the first component body end region, the outer body has a first outer body end portion which is preferably substantially cylindrical and the inner body has a first inner body end portion which is received in the first outer body end portion and is preferably substantially cylindrical, and/or that, in the second component body end region, the outer body has a second outer body end portion which is preferably substantially cylindrical and the inner body has a second inner body end portion which is received in the second outer body end portion and is preferably substantially cylindrical.

In the case of such a configuration, the fastening region can be provided on the first component body end region or the second component body end region. Since such a fastening region is formed only in a single one of the component body end regions, in all the other regions, in particular also in the other component body end region, the inner body and the outer body can move in a defined manner relative to one another guided by the sliding guide.

For example, the first inner body end portion can be fixed on the first outer body end portion or the second inner body end portion can be fixed on the second outer body end portion.

A fastening which is resistant to thermal influences and is chemically resistant can be achieved, for example, in that, in the fastening region, the inner body is fixed on the outer body by material connection and/or interference fit.

In order to provide a defined guide action, the sliding guide can include, on the outer body, at least one guide recess which extends substantially in the direction of the component body longitudinal axis and is open in relation to the component body longitudinal axis substantially radially inward in the direction of an outer body inner space and, on the inner body in assignment to each guide recess, at least one guide projection which extends substantially in the direction of the component body longitudinal axis and engages in relation to the component body longitudinal axis substantially radially outward into the assigned guide recess.

In order to be able to accommodate dimensional changes in the longitudinal direction, but also transversely to the longitudinal direction, it is proposed that at least one, preferably each guide projection is received displaceably in the assigned guide recess substantially in the direction of the component body longitudinal axis and/or substantially transversely to the component body longitudinal axis.

In the case of one configuration which is structurally easy to realize, at least one, preferably each guide recess can be formed in an outer body shell-adjoining region of two outer body shells against one another.

To this end, for example, in the outer body shell-adjoining region each of the outer body shells can include an outer body connection/guide edge which extends substantially radially outward in the direction of the component body longitudinal axis along an outer body shell-shell body and from the outer body shell-shell body in relation to the component body longitudinal axis with an outer body guide edge portion which adjoins the outer body shell-shell body and an outer body connection edge portion which adjoins the outer body guide edge portion at a side of the outer body guide edge portion facing away from the outer body shell-shell body, and, in the outer body shell-adjoining region, the outer body connection edge portions of the outer body shells can be fixedly connected to one another and the guide recess can be formed between the outer body guide edge portions of the outer body shells.

The exhaust gas conducting component can be constructed with a small number of components if the outer body includes two, that is, for example, exactly two, outer body shells, and a first guide recess is formed in a first outer body shell-adjoining region of the two outer body shells and a second guide recess is formed in a second outer body shell-adjoining region of the two outer body shells.

It can furthermore be provided for a defined guide action of the sliding guide that two guide recesses which are substantially diametrically opposite one another in relation to the component body longitudinal axis are provided on the outer body, and/or that at least one, preferably each guide recess is formed to be continuously free of interruptions in the direction of the component body longitudinal axis.

At least one, preferably each guide projection can also be formed in an inner body shell-adjoining region of two inner body shells against one another in the region of the inner body for a structure which is easy to realize.

For this purpose, in the inner body shell-adjoining region, each of the inner body shells can include an inner body connection/guide edge extending in the direction of the component body longitudinal axis along an inner body shell-shell body and substantially radially outward from the inner body shell-shell body in relation to the component body longitudinal axis, and, in the inner body shell-adjoining region, the inner body connection/guide edges of the inner body shells can be fixedly connected to one another and form the guide projection.

For a structure which requires a small number of component components also in the region of the inner body, it is proposed that the inner body includes two, that is, for example, exactly two, inner body shells, and that a first guide projection is formed in a first inner body shell-adjoining region of the two inner body shells and a second guide projection is formed in a second inner body shell-adjoining region of the two inner body shells.

Insulating material can be arranged in a gap formed between the outer body and the inner body in order to obtain improved thermal insulation.

The disclosure furthermore relates to an exhaust gas system, including at least one exhaust gas routing component constructed according to the disclosure.

BRIEF DESCRIPTION OF DRAWINGS

The invention will now be described with reference to the drawings wherein.

DETAILED DESCRIPTION

Figure 1:
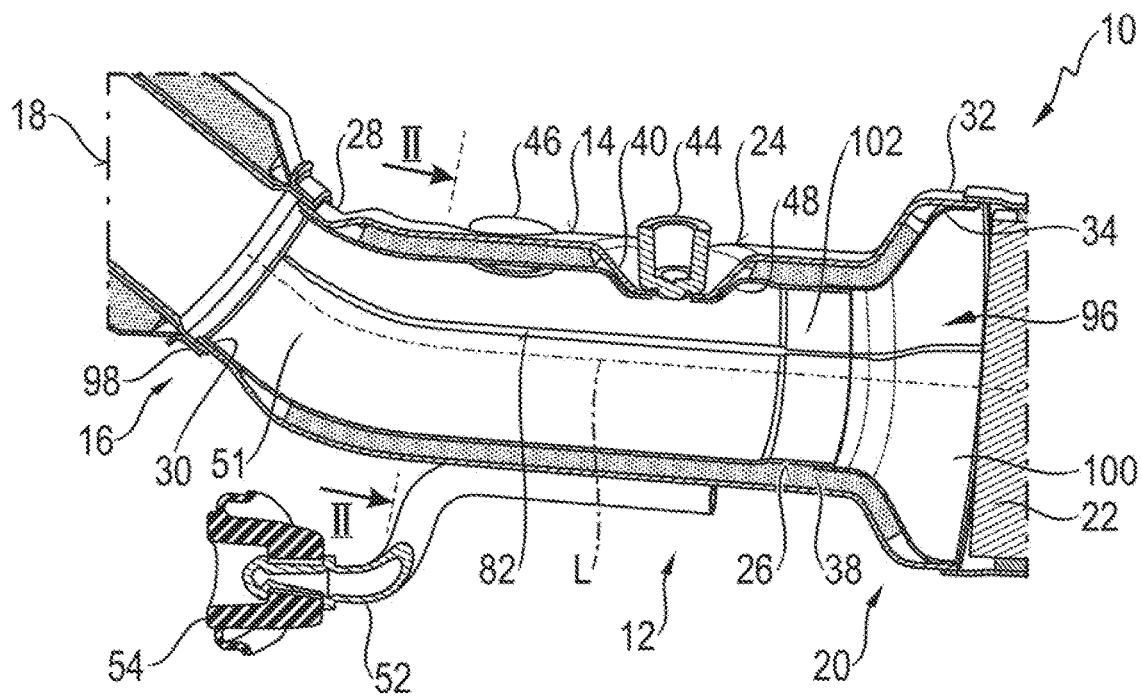
FIG. 1 shows a partial longitudinal sectional view of an exhaust gas system with a tube-like exhaust gas routing component; and, FIG. 2 shows a perspective cross-sectional view of the exhaust gas routing component represented in FIG. 1, with a section along a line II-II in FIG. 1.

A sub-region of an exhaust gas system designated generally by 10 for an internal combustion engine, for example, a vehicle is shown in longitudinal section in FIG. 1. The exhaust gas system 10 includes an exhaust gas routing component 12 through which exhaust gas can flow during operation of an internal combustion engine with a component body 14 formed in a tube-like manner. The component body 14 has an upstream first component body end region 16 in which it adjoins a further, for example, tube-like exhaust gas routing component 18. The component body 14 furthermore has a downstream second component body end region 20 in which it likewise adjoins a further, for example, tube-like exhaust gas routing component 22.

The component body 14 is formed to be double-walled and includes a tube-like outer body 24 and an inner body 26 received in the tube-like outer body 24 and is also formed in a tube-like manner. In order to enable a stable and gas-tight connection of the component body 14 in the first component body end region 16 to the further exhaust gas routing component 18, in the first component body end region 16, the outer body 24 is formed with a substantially cylindrical first outer body end portion 28. The inner body 26 is equally, in the first component body end region 16, formed with a substantially cylindrical first inner body end portion 30 which is received in the first outer body end portion 28 and, for example, terminates flush with these in the direction of a component body longitudinal axis L. In the region of the first outer body end portion 28, the outer body 24 can be fixedly connected to the inner body 26 in the region of its first inner body end portion 30, for example, by material connection, such as, for example, welding, and/or by interference fit.

The component body longitudinal axis L can be a longitudinal central axis of the component body 14 which extends along the profile, which is also, for example, curved in regions, of the component body 14 and in each length region can define, for example, substantially the cross-section center of the component body 14.

In the second component body end region 20, the outer body 24 has a substantially cylindrically formed second outer body end portion 32. The inner body 26 correspondingly also has in the second component body end region 20 a substantially cylindrically shaped second inner body end portion 34 which is received in the second outer body end portion 32 with a tight fit, but is not fixed thereon.

It is apparent in FIG. 1 that, for adjustment to the further exhaust gas routing component 33 adjoining the exhaust gas routing component 14 in the second component body end region 20, the component body 14 can have a radial expansion in relation to the component body longitudinal axis L in the transition to the second component body end region 20 or to the second outer body end portion 32 and to the second inner body end portion 34.

Insulating material 38 which, in addition to radial spacing of the outer body 24 to the inner body 26, ensures good thermal insulation between the outer body 24 and the inner body 26 can be arranged at least in regions in a gap 36 formed between the outer body 24 and the inner body 26.

A connecting piece 44, for example, for accommodating a temperature sensor or the like and a connecting piece 46 for accommodating an injector which injects a reagent into the exhaust gas flow or a further sensor can be provided on the outer body 24, for example, in the region of respective radially inwardly directed indentations 40, 42. In the region of the indentations 40, 42 of the outer body 24, the inner body 26 can also have corresponding indentations 48, 50 with respective openings via which the connecting pieces 44, 46 are open to the volume 51 which is formed in the inner body 26 and through which exhaust gas can flow. It should be pointed out that the outer body 24 is in principle not fixedly connected to the inner body 26 even in the region of the indentations 40, 48 and 42, 50 associated with one another.

For stable retention of the exhaust gas system 10 on a vehicle, one or more carrier struts 52 can be provided on the component body 14 or on the outer body 24 thereof, which carrier struts 52 can realize support of the exhaust gas system 10 which ensures vibration decoupling, for example, in relation to the base of a vehicle via, for example, bearing collars 54 constructed with rubber material.

Figure 2:
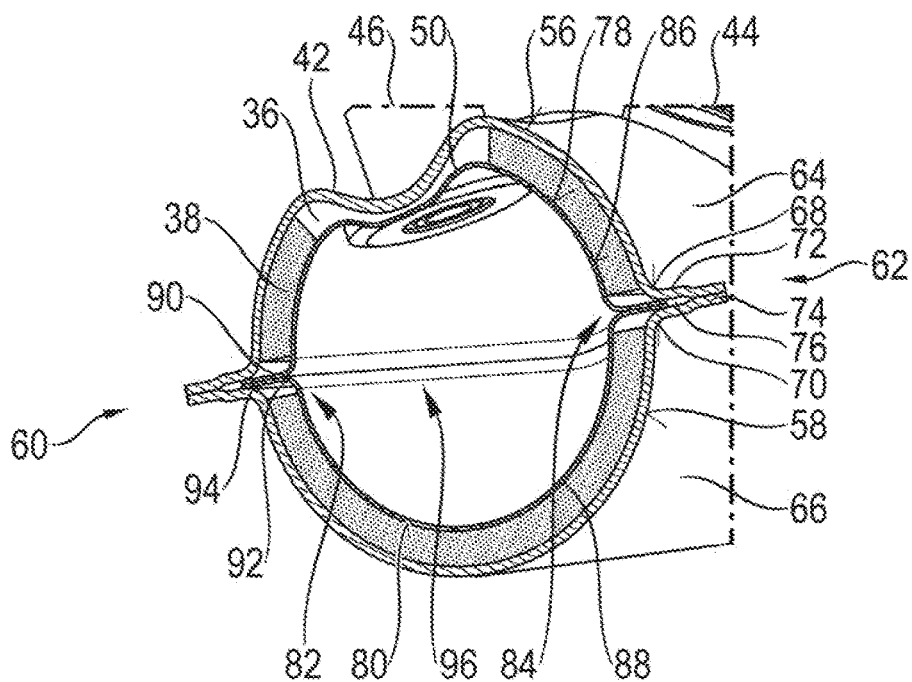

As shown in FIG. 2, the outer body 24 is constructed with two outer body shells 56, 58 formed, for example, as shaped sheet-metal parts. For example, the connecting pieces 44, 46 can be formed on the outer body shell 56, and the carrier struts 52 can be fixed on the outer body shell 58.

The two outer body shells 56, 58 adjoin one another in outer body shell-adjoining regions 60, 62 extending substantially in the direction of the component body longitudinal axis L. In each of the outer body shell-adjoining regions 60, 62, each outer body shell 56, 58 has an outer body connection/guide edge 68, 70 extending along a respective outer body shell-shell body 64, 66 substantially in the direction of the component body longitudinal axis L and radially outwardly with respect thereto. Each outer body connection/guide edge 68, 70 includes an outer body guide edge portion 72 which adjoins the respective outer body shell-shell body 64, 66 as well as an outer body connection edge portion 74 which adjoins the respective outer body guide portion 72 on its side facing away from the respective outer body shell-shell body 64, 66.

In the region of the outer body connection edge portions 74 of the outer body connection/guide edges 68, 70 formed in the two outer body shell-adjoining regions 60, 62, the outer body shells 56, 58 bear against one another and are connected to one another fixedly and in a gas-tight manner, for example, by welding. In the case of outer body connection edge portions 74 which adjoin one another, the outer body guide edge portions 72 of the outer body connection/guide edges 68, 70 assigned to one another have a distance to one another such that a guide recess 76 is formed between them which is open radially inward to an outer body inner space containing the inner body 26 and extends along the outer body 24 preferably without interruption between the component body end regions 16, 20.

In order to enable a linking of the component body 14 to the further exhaust gas routing components 18, 22 in the component body end regions 16, 20, the outer body 24 is or the two outer body shells 56, 58 are, in the outer body end portions 28, 32, not formed with the radially outwardly projecting outer body connection/guide edges 68, 70. These already end in front of the outer body end portions 28, 32 so that they can be formed on their outer circumference, for example, with a circle-like circumferential contour.

The inner body 26 is constructed in accordance with the outer body 24 with two inner body shells 78, 80 formed, for example, as shaped sheet-metal parts. These adjoin one another in inner body shell-adjoining regions 82, 84 extending in the direction of the component body longitudinal axis L, wherein each inner body shell-adjoining region 82, 84 is assigned to one of the outer body shell-adjoining regions 60, 62 and is opposite this.

In each of the inner body shell-adjoining regions 82, 84, the inner body shells 78, 80 have inner body connection/guide edges 90, 92 which extend from a respective inner body shell-shell body 86, 88 radially outward and substantially in the direction of the component body longitudinal axis L. In the region of the inner body connection/guide edges 90, 92 assigned to one another in pairs, the two inner body shells 78, 80 are connected to one another fixedly and in a gas-tight manner, for example, by welding. Each pair of inner body connection/guide edges 90, 92 connected fixedly to one another forms a guide projection 94 which extends radially outwardly in relation to the component body longitudinal axis L and runs through substantially without interruptions in the direction thereof. Each of the thus formed guide projections 94 engages radially outwardly into one of the guide recesses 76 formed in the outer body shell-adjoining regions 60, 62 so that a sliding guide 96 for the inner body 26 in relation to the outer body 24 is formed by the two guide projections 94 which engage in each case into a guide recess 76.

In order to provide an outer circumferential contour which is, for example, substantially circular and is not influenced by the radially outwardly engaging guide projections 94 also on the inner body 26 on the two inner body end portions 30, 34, the inner body connection/guide edges 90, 92 which extend in principle substantially over the entire length of the inner body 26 end shortly in front of the inner body end portions 30, 34. No radially outwardly engaging guide projections 94 are thus provided in the inner body end portions 30, 34, which guide projections 94 could impair the adjustment of the inner body end portions 30, 34 into the outer body end portions 28, 32.

As already stated, in the region of the first component body end region 16, the outer body 24 and the inner body 26 can be fixedly connected to the first outer body end portion 28 or first inner body end portion 30, for example, by material connection, for example, welding, so that there is formed at the first component body end region 16 a fastening region 98 in which a fixed connection between the outer body 24 and the inner body 26 is formed, so that a relative movement between the outer body 24 and the inner body 26 cannot arise in this fastening region 98. In all of the longitudinal regions which lie outside the fastening region 98, the outer body 24 and the inner body 26 are not fixedly connected to one another so that, in all the longitudinal regions which lie outside the fastening region 98, the inner body 26 can move under the guide action of the sliding guide 96 in a defined manner in relation to the outer body 24. In particular, as a result of the sliding guide 96 which runs substantially in the direction of the component body longitudinal axis L, the inner body 26 can move in the direction of the component body longitudinal axis L in relation to the outer body 24. Moreover, the inner body can move under the guiding action of the sliding guide 96 radially in relation to the outer body 24. Such an axial or radial relative movement between the inner body 26 and the outer body 24 can occur in particular if the inner body 26 is heated to a greater extent when comparatively hot exhaust gas flows through and therefore will have a higher temperature than the outer body 24. A higher temperature of the inner body 26 leads to a greater thermally induced expansion thereof both in the axial and radial direction. In the case of such a different thermally induced change in dimensions, the guide projections 94 can be displaced in the guide recesses 76 which respectively accommodate these in the direction of the component body longitudinal axis L and can dip into these radially outward to a greater extent. Since there is a fixed point only in the single fastening region 98 on the first component body end region 16, in all the other longitudinal regions, such a relative movement between the inner body 26 and the outer body 24 can occur, no stresses between the inner body 26 and the outer body 24 arise which lead in particular to excessive loading in the fastening region 98. A bearing which permits a relative movement of the inner body 26 in relation to the outer body 24 and enables a defined movement between inner body 26 and outer body 24, for example, in the case of excitation by oscillations or vibrations, is also provided via the sliding guide 96. This bearing action or defined guidance of the inner body 26 in relation to the outer body 24 can be further assisted by the insulating material 38 which is provided, for example, with wire material, such as knitted wire mesh or fleece material and which is positioned between the inner body 26 and the outer body 24.

In the case of the structure represented in the figures, the inner body 26 constructed in principle with the two inner body shells 78, 80 can be divided into two parts 100, 102 which adjoin one another in the direction of the component body longitudinal axis L, wherein the change already discussed above in the radial dimensions of the inner body 26 in the transition to the second inner body end portion 34 is provided in particular in the part 100. Each of these parts 100, 102 of the inner body 26 can be provided by a correspondingly shaped portion of the two inner shells 78, 80 so that each inner shell 78, 80 can also be composed of two parts.

It is understood that the foregoing description is that of the preferred embodiments of the invention and that various changes and modifications may be made thereto without departing from the spirit and scope of the invention as defined in the appended claims.

The invention claimed is:

1. An exhaust gas routing component for an exhaust gas system of an internal combustion engine, the exhaust gas routing component comprising:
   a tube-like component body defining a longitudinal axis (L);
   said tube-like component body having a first component body end region and a second component body end region;
   said second component body end region being arranged in the direction of said longitudinal axis (L) at a distance from said first component body end region;
   said component body including a tube-like outer body and a tube-like inner body accommodated in said tube-like outer body;
   said inner body being fixed in a fastening region to said outer body;
   a sliding guide acting between said outer body and said inner body;
   said sliding guide being configured to permit a relative movement of said inner body relative to said outer body outside of said fastening region;
   wherein:
   said outer body defines an inner space; and,
   said sliding guide comprises:
   a guide recess extending in the direction of said longitudinal axis (L), and with reference to said longitudinal axis (L), opening radially inwardly to said inner space of said outer body; and,
   on said inner body in assignment to said guide recess, a guide projection extending in the direction of said longitudinal axis (L) and engaging, in relation to said longitudinal axis (L), radially outwardly into said guide recess assigned thereto.

2. The exhaust gas routing component of claim 1, wherein at least one of the following applies:
   i) in said first component body end region, said outer body has a first outer body end portion and said inner body has a first inner body end portion received in said first outer body end portion; and,
   ii) in said second component body end region, said outer body has a second outer body end portion and said inner body has a second inner body end portion received in said second outer body end portion.

3. The exhaust gas routing component of claim 2, wherein said first outer body end portion is cylindrical, said first inner body end portion is cylindrical; said second outer body end portion is cylindrical; and, said second inner body end portion is cylindrical.

4. The exhaust gas routing component of claim 2, wherein said fastening region is provided on said first component body end region or on said second component body end region.

5. The exhaust gas routing component of claim 2, wherein said first inner body end portion is fixed on said first outer body end portion; or, said second inner body end portion is fixed on said second outer body end portion.

6. The exhaust gas routing component of claim 1, wherein, in said fastening region, said inner body is fixed on said first outer body by material connection and/or interference fit.

7. The exhaust gas routing component of claim 1, wherein said guide projection is received displaceably in said guide recess in the direction of said longitudinal axis (L) and/or transversely to said longitudinal axis (L).

8. The exhaust gas routing component of claim 1, wherein said outer body includes first and second outer body shells conjointly defining an outer body shell-adjoining region; and, said guide recess is formed in said outer body shell-adjoining region.

9. The exhaust gas routing component of claim 8, wherein, in said outer body shell-adjoining region, each of said outer body shells comprises an outer body connection/guide edge extending radially outwardly in the direction of said longitudinal axis (L) along an outer body shell-shell body and from said outer shell-shell body in relation to said longitudinal axis (L) with an outer body guide edge portion which adjoins the outer body shell-shell body and an outer body connection edge portion which adjoins said outer body guide edge portion at a side of said outer body guide edge portion facing away from said outer body shell-shell body; and, in said outer body shell-adjoining region, said outer body connection edge portions of said outer body shells are fixedly connected to one another and said guide recess is formed between said outer body guide edge portions of said outer body shells.

10. The exhaust gas routing component of claim 8, wherein said guide recess is a first guide recess and said exhaust gas routing component comprises a second guide recess; said first and second outer body shells have respective first and second adjoining regions; and, said first guide recess is formed in said first outer body shell adjoining region and said second guide recess is formed in said second one of said outer body shell adjoining regions.

11. The exhaust gas routing component of claim 10, wherein said first and second guide recesses, which are diametrically opposite one another in relation to said longitudinal axis (L), are provided on said outer body, and/or said guide recesses are each formed to be continuously free of interruptions in the direction of said longitudinal axis (L).

12. The exhaust gas routing component of claim 11, wherein said inner body includes first and second inner body shells conjointly defining an inner body shell-adjoining region; and, said guide projection is formed in said inner body shell-adjoining region.

13. The exhaust gas routing component of claim 12, wherein each of said inner body shells includes an inner body connection/guide edge extending in the direction of said longitudinal axis (L) along an inner body shell-shell body and radially outwardly from said inner body shell-shell body in relation to said longitudinal axis (L); and, in said inner body shell-adjoining region, said inner body connecting/guide edges of said inner body shells are fixedly connected to one another and form said guide projection.

14. The exhaust gas routing component of claim 11, wherein said first and second inner body shells conjointly define first and second inner body shell-adjoining regions; said guide projection is a first guide projection and said exhaust gas routing component further comprises a second guide projection; and, said first and second guide projections are formed in said first and second inner body shell-adjoining regions, respectively.

15. The exhaust gas routing component of claim 1, wherein said outer body and said inner body conjointly define a gap therebetween; and, said exhaust gas routing component further comprises insulating material disposed in said gap.

16. An exhaust gas system of an internal combustion engine, the exhaust gas system comprising:
 a first tube-like exhaust gas routing component;
 a second tube-like exhaust gas routing component;
 a third tube-like exhaust gas routing component interconnecting said first and second tube-like exhaust gas routing components; and,
 said third tube-like exhaust gas routing component including:
 a tube-like component body defining a longitudinal axis (L);
 said tube-like component body having a first component body end region and a second component body end region;
 said second component body end region being arranged in the direction of said longitudinal axis (L) at a distance from said first component body end region;
 said component body including a tube-like outer body and a tube-like inner body accommodated in said tube-like outer body;
 said inner body being fixed in a fastening region to said outer body;
 a sliding guide acting between said outer body and said inner body;
 said sliding guide being configured to permit a relative movement of said inner body relative to said outer body outside of said fastening region;
 wherein:
 said outer body defines an inner space; and,
 said sliding guide comprises:
 a guide recess extending in the direction of said longitudinal axis (L), and with reference to said longitudinal axis (L), opening radially inwardly to said inner space of said outer body; and,
 on said inner body in assignment to said guide recess, a guide projection extending in the direction of said longitudinal axis (L) and engaging, in relation to said longitudinal axis (L), radially outwardly into said guide recess assigned thereto.

\* \* \* \* \*